(12) United States Patent
Matsushita et al.

(10) Patent No.: US 11,919,806 B2
(45) Date of Patent: *Mar. 5, 2024

(54) INFRARED TRANSMITTING GLASS

(71) Applicant: NIPPON ELECTRIC GLASS CO., LTD., Otsu (JP)

(72) Inventors: Yoshimasa Matsushita, Otsu (JP); Fumio Sato, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 905 days.

This patent is subject to a terminal disclaimer.

(21) Appl. No.: 16/961,738

(22) PCT Filed: Jan. 18, 2019

(86) PCT No.: PCT/JP2019/001396
§ 371 (c)(1),
(2) Date: Jul. 13, 2020

(87) PCT Pub. No.: WO2019/167462
PCT Pub. Date: Sep. 6, 2019

(65) Prior Publication Data
US 2021/0053866 A1  Feb. 25, 2021

(30) Foreign Application Priority Data
Feb. 28, 2018  (JP) .................. 2018-034346

(51) Int. Cl.
| | |
|---|---|
| C03C 3/062 | (2006.01) |
| C03C 4/10 | (2006.01) |
| G01J 1/04 | (2006.01) |
| G01J 1/42 | (2006.01) |
| G02B 5/20 | (2006.01) |

(52) U.S. Cl.
CPC ............... *C03C 3/062* (2013.01); *C03C 4/10* (2013.01); *G01J 1/0488* (2013.01); *G01J 1/42* (2013.01); *G02B 5/208* (2013.01); *C03C 2204/00* (2013.01)

(58) Field of Classification Search
CPC ....................................................... C03C 3/32
See application file for complete search history.

(56) References Cited

U.S. PATENT DOCUMENTS

| | | |
|---|---|---|
| 4,647,545 A | 3/1987 | Lucas et al. |
| 2004/0235634 A1 | 11/2004 | Kobayashi et al. |
| 2006/0233512 A1 | 10/2006 | Aitken et al. |
| 2006/0257097 A1 | 11/2006 | Aitken et al. |
| 2010/0285946 A1 | 11/2010 | Tani et al. |
| 2013/0278999 A1 | 10/2013 | Carlie |
| 2016/0168015 A1 | 6/2016 | Carlie |
| 2018/0257977 A1* | 9/2018 | Nagashima ............... C03C 3/32 |
| 2022/0127185 A1* | 4/2022 | Matsushita ............... C03C 4/10 |
| 2022/0144687 A1* | 5/2022 | Matsushita ............. C03C 3/323 |

FOREIGN PATENT DOCUMENTS

| | | |
|---|---|---|
| CN | 104411649 A | 3/2015 |
| JP | 2004-043294 A | 2/2004 |
| JP | 2006-290738 A | 10/2006 |
| JP | 2009-161374 A | 7/2009 |
| JP | 2010-006692 A | 1/2010 |
| JP | 2016-088761 A | 5/2016 |
| JP | 2018-177565 A | 11/2018 |
| WO | 2017/086227 A1 | 5/2017 |
| WO | 2017/110500 A1 | 6/2017 |

* cited by examiner

*Primary Examiner* — Karl E Group
(74) *Attorney, Agent, or Firm* — Keating & Bennett, LLP

(57) ABSTRACT

Provided is a glass having an excellent infrared transmittance and suitable for use in infrared sensors. An infrared transmitting glass containing, in terms of % by mole, over 0 to 50% Ge, over 0 to 50% Ga, over 0 to 50% Si, 20 to 90% Te, 0 to 40% Ag+Al+Ti+Cu+In+Sn+Bi+Cr+Sb+Zn+Mn, and 0 to 40% F+Cl+Br+I.

5 Claims, No Drawings

INFRARED TRANSMITTING GLASS

TECHNICAL FIELD

The present invention relates to infrared transmitting glasses for use in infrared sensors and so on.

BACKGROUND ART

Vehicle-mounted night vision devices, security systems, and the like include infrared sensors for use to detect living bodies at night. To sense infrared rays with wavelengths of about 8 to 14 μm emitted from living bodies, such an infrared sensor is provided, in front of the sensor part, with an optical element, such as a filter or a lens, capable of transmitting infrared rays in the above wavelength range.

Examples of a material for the optical element as described above include Ge and ZnSe. These materials are crystalline bodies and therefore have poor workability, which makes them difficult to work into complicated shapes, such as an aspheric lens. For this reason, these materials have a problem of difficulty in mass production of the above optical element and also have a problem of difficulty in size reduction of the infrared sensor.

To cope with the above, chalcogenide glasses are proposed as vitreous materials that can transmit infrared rays with wavelengths of about 8 to 14 μm and can be relatively easily processed into shape (see, for example, Patent Literature 1).

CITATION LIST

Patent Literature

[PTL 1]
JP-A-2009-161374

SUMMARY OF INVENTION

Technical Problem

The glass described in Patent Literature 1 has an infrared transmittance significantly decreasing at a wavelength of 10 μm or more and, therefore, particularly its sensitivity to infrared rays emitted from living bodies is poor, so that an infrared sensor may not sufficiently function.

In view of the above, the present invention has an object of providing a glass having an excellent infrared transmittance and suitable for use in infrared sensors.

Solution to Problem

The inventors conducted intensive studies and, as a result, found that the above problem can be solved by a chalcogenide glass having a particular composition.

Specifically, an infrared transmitting glass according to the present invention contains, in terms of % by mole, over 0 to 50% Ge, over 0 to 50% Ga, over 0 to 50% Si, 20 to 90% Te, to 40% Ag+Al+Ti+Cu+In+Sn+Bi+Cr+Sb+Zn+Mn, and 0 to 40% F+Cl+Br+I. As used herein, "(component)+(component)+. . ." means that the total sum of the contents of the relevant components.

The infrared transmitting glass according to the present invention is preferably substantially free of Cd, Tl, and Pb.

The infrared transmitting glass according to the present invention preferably has an infrared absorption edge wavelength of 20 μm or more when having a thickness of 2 mm.

As used in the present invention, "infrared absorption edge wavelength" refers to a wavelength at which the light transmittance reaches 0.5% in an infrared range of wavelengths of not less than 8 μm.

In an optical element according to the present invention, the above-described infrared transmitting glass is used.

In an infrared sensor according to the present invention, the above-described optical element is used.

Advantageous Effects of Invention

The infrared transmitting glass according to the present invention has an excellent infrared transmittance and is suitable for use in infrared sensors.

Description of Embodiments

An infrared transmitting glass according to the present invention contains, in terms of % by mole, over 0 to 50% Ge, over 0 to 50% Ga, over 0 to 50% Si, 20 to 90% Te, 0 to 40% Ag+Al+Ti+Cu+In+Sn+Bi+Cr+Sb+Zn+Mn, and 0 to 40% F+Cl+Br+I. The reasons why the glass composition is defined as above will be described below. In the following description of the respective contents of components, "%" refers to "% by mole" unless otherwise specified.

Ge is an essential component for forming the glass network. The content of Ge is over 0 to 50%, preferably 2 to 40%, more preferably 4 to 35%, still more preferably 5 to 30%, even still more preferably 7 to 25%, and particularly preferably 10 to 20%. If the content of Ge is too small, vitrification becomes difficult. On the other hand, if the content of Ge is too large, Ge-based crystals precipitate to make infrared rays less likely to pass through the glass and the raw material cost tends to rise.

Ga is an essential component that increases the thermal stability of the glass (the stability of vitrification). The content of Ga is over 0 to 50%, preferably 2 to 40%, more preferably 4 to 30%, still more preferably 5 to 25%, and particularly preferably 5 to 20%. If the content of Ga is too small, vitrification becomes difficult. On the other hand, if the content of Ga is too large, Ga-based crystals precipitate to make infrared rays less likely to pass through the glass and the raw material cost tends to rise.

Si is an essential component that increases the thermal stability of the glass (the stability of vitrification). The content of Si is over 0 to 50%, preferably 1 to 45%, more preferably 2 to 40%, still more preferably 3 to 35%, even still more preferably 4 to 30%, yet even still more preferably 5 to 25%, and particularly preferably 5 to 20%. If the content of Si is too small, vitrification becomes difficult. On the other hand, if the content of Si is too large, infrared absorption due to Si is likely to occur, so that infrared rays are less likely to pass through the glass.

Te, which is a chalcogen element, is an essential component that forms the glass network. The content of Te is 20 to 90%, preferably 30 to 88%, more preferably 40 to 85%, still more preferably 45 to 82%, even still more preferably 50 to 80%, yet even still more preferably 55 to 80%, and particularly preferably 60 to 80%. If the content of Te is too small, vitrification becomes difficult. On the other hand, if the content of Te is too large, Te-based crystals precipitate to make infrared rays less likely to pass through the glass.

Ag, Al, Ti, Cu, In, Sn, Bi, Cr, Sb, Zn, and Mn are components that increase the thermal stability of the glass without decreasing the infrared transmission properties. The content of Ag+Al+Ti+Cu+In+Sn+Bi+Cr+Sb+Zn+Mn is 0 to 40%, preferably 2 to 35%, more preferably 4 to 30%, and particularly preferably 5 to 25%. If the content of Ag+Al+Ti+Cu+In+Sn+Bi+Cr+Sb+Zn+Mn is too large, vitrification becomes difficult. The content of each component of Ag, Al, Ti, Cu, In, Sn, Bi, Cr, Sb, Zn, and Mn is preferably 0 to 40%, more preferably 1 to 40%, still more preferably 1 to 30%, even still more preferably 1 to 25%, and particularly preferably 1 to 20%. Of these, the use of Ag, Al, Cu or Sn is preferred because their effect of increasing the thermal stability of the glass is particularly large.

F, Cl, Br, and I are also components that increase the thermal stability of the glass. The content of F+Cl+Br+I is 0 to 40%, preferably 2 to 35%, more preferably 4 to 30%, and particularly preferably 5 to 25%. If the content of F+Cl+Br+I is too large, vitrification becomes difficult and the weather resistance is likely to decrease. The content of each component of F, Cl, Br, and I is preferably 0 to 40%, more preferably 1 to 40%, still more preferably 1 to 30%, even still more preferably 1 to 25%, and particularly preferably 1 to 20%. Of these, I is preferred because elemental iodine material is usable and its effect of increasing the thermal stability of the glass is particularly large.

The infrared transmitting glass according to the present invention may contain, in addition to the above components, the following components.

Se and As are components that widen the vitrification range and increase the thermal stability of the glass. The content of each of them is preferably 0 to 10% and particularly preferably 0.5 to 5%. However, these components are toxic and, therefore, the glass is preferably free of these components from the viewpoint of reducing the influences on environment and human bodies.

The infrared transmitting glass according to the present invention is preferably substantially free of Cd, Tl, and Pb which are toxic substances. By doing so, the influence on environment can be minimized. Herein, "substantially free of" means that no amount of these components are deliberately contained in the raw materials, and is not intended to exclude even the incorporation thereof in impurity level. Objectively, the content of each component is preferably less than 0.1%.

The infrared transmitting glass according to the present invention has an excellent infrared transmittance at wavelengths of about 8 to 18 μm. An example of an index for evaluating the infrared transmittance is an infrared absorption edge wavelength. It can be determined that the larger the infrared absorption edge wavelength, the more excellent the infrared transmittance. The infrared transmitting glass according to the present invention preferably has, when having a thickness of 2 mm, preferably 20 μm or more and particularly preferably 21 μm or more.

The infrared transmitting glass according to the present invention can be produced, for example, in the following manner. First, raw materials are formulated to give a desired composition. Next, the formulated raw materials are put into a quartz glass ampoule evacuated with the application of heat and the quartz glass ampoule is sealed with an oxygen burner while being evacuated. Thereafter, the sealed quartz glass ampoule is held at about 650 to 1000° C. for six to twelve hours and then rapidly cooled to room temperature, thus obtaining an infrared transmitting glass according to the present invention.

Elemental materials (for example, Ge, Ga, Si, Te, Ag and/or I) may be used as the raw materials or compound materials (for example, $GeTe_4$, $Ga_2Te_3$, and/or AgI) may be used as the raw materials. Alternatively, these types of raw materials may be used in combination.

An optical element can be produced by working the infrared transmitting glass obtained in the above manner into a predetermined shape (such as a disc shape or a lenticular shape).

For the purpose of increasing the transmittance, an antireflection film may be formed on one or both sides of the optical element. Examples of the method for forming the antireflection film include vacuum deposition, ion plating, and sputtering.

Alternatively, after the antireflection film is formed on the infrared transmitting glass, the infrared transmitting glass may be worked into the predetermined shape. However, for the reason that the antireflection film is likely to peel off during the working process, the antireflection film is preferably formed after the infrared transmitting glass is worked into the predetermined shape, unless the circumstances are exceptional.

Since the infrared transmitting glass according to the present invention has an excellent infrared transmittance and excellent weather resistance, it is suitable as a cover member for protecting a sensor part of an infrared sensor or an optical element, such as a lens for focusing infrared light on an infrared sensor part of the infrared sensor.

EXAMPLES

Hereinafter, the present invention will be described with reference to examples, but is not limited to these examples.

Tables 1 and 2 show Examples of the present invention and Comparative Examples.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Glass | Ge | 15 | 17.5 | 17.5 | 15 | 15 | 15 | 12.5 | 7.5 | 30 |
| Composition | Ga | 5 | 5 | 10 | 5 | 7.5 | 2.5 | 7.5 | 17.5 | 12.5 |
| (% by | Si | 2.5 | 7.5 | 12.5 | 5 | 10 | 2.5 | 10 | 15 | 2.5 |
| mole) | Te | 77.5 | 70 | 60 | 75 | 67.5 | 80 | 70 | 60 | 55 |
| | Ag | | | | | | | | | |
| | Sn | | | | | | | | | |
| | I | | | | | | | | | |
| Vitrification | | Vitrified | Vitrified | Vitrified | Vitrified | Vitrified | Vitrified | Vitrified | Vitrified | Vitrified |
| Infrared Absorption Edge Wavelength (μm) | | 24.3 | 24.2 | 24.2 | 24.3 | 24.3 | 24.3 | 24.1 | 24.3 | 24.2 |

TABLE 2

|  |  | Examples | | | | | | Comparative Examples | |
| --- | --- | --- | --- | --- | --- | --- | --- | --- | --- |
|  |  | 10 | 11 | 12 | 13 | 14 | 15 | 1 | 2 |
| Glass Composition (% by mole) | Ge | 45 | 2.5 | 22.5 | 15 | 10 | 15 | 20 | 40 |
|  | Ga | 5 | 35 | 25 | 5 | 2.5 | 5 |  | 5 |
|  | Si | 5 | 10 | 25 | 2.5 | 2.5 | 5 |  | 40 |
|  | Te | 45 | 52.5 | 27.5 | 67.5 | 75 | 65 | 80 | 15 |
|  | Ag |  |  |  | 10 |  |  |  |  |
|  | Sn |  |  |  |  | 10 |  |  |  |
|  | I |  |  |  |  |  | 10 |  |  |
| Vitrification |  | Vitrified | Vitrified | Vitrified | Vitrified | Vitrified | Vitrified | Not vitrified | Not vitrified |
| Infrared Absorption Edge Wavelength (μm) |  | 24.1 | 24.3 | 24.2 | 24.4 | 24.3 | 24.2 | No transmission | No transmission |

Each sample was prepared in the following manner. Raw materials were mixed to give each of the glass compositions described in Tables 1 and 2, thus obtaining a raw material batch. A quartz glass ampoule washed in pure water was evacuated with the application of heat, the raw material batch was then put into the quartz glass ampoule, and the quartz glass ampoule was sealed with an oxygen burner while being evacuated.

The sealed quartz glass ampoule was raised in temperature to 650 to 1000° C. at a rate of 10 to 20° C./hour in a melting furnace and then held for six to twelve hours. During the holding time, the quartz glass ampoule was turned upside down every two hours to stir the melt. Thereafter, the quartz glass ampoule was taken out of the melting furnace and rapidly cooled to room temperature, thus obtaining a sample.

Each of the obtained samples was subjected to X-ray diffraction and, based on its diffraction spectrum, whether the sample became vitrified was confirmed. In the tables, vitrified samples are represented to be "vitrified", whereas unvitrified samples are represented to be "not vitrified". Furthermore, each sample was measured in terms of light transmittance at a thickness of 2 mm to determine the infrared absorption edge wavelength.

As shown in Table 1, the samples in Examples 1 to 15 were confirmed to become vitrified. Furthermore, these samples had infrared absorption edge wavelengths of 24.1 to 24.4 μm and thus exhibited good light transmittances in an infrared range of wavelengths of approximately 8 to 18 μm.

On the other hand, the samples in Comparative Examples 1 and 2 were not vitrified and their light transmittances were approximately 0% in a wavelength range of 2 to 24 μm.

INDUSTRIAL APPLICABILITY

The infrared transmitting glass according to the present invention is suitable as a cover member for protecting a sensor part of an infrared sensor or an optical element, such as a lens for focusing infrared light on an infrared sensor part of the infrared sensor.

The invention claimed is:

1. An infrared transmitting glass containing, in terms of % by mole, over 0 to 50% Ge, over 0 to 50% Ga, over 0 to 50% Si, 20 to 90% Te, 0 to 40% Ag+Al+Ti+Cu+In+Sn+Bi+Cr+Sb+Zn+Mn, and 0 to 40% F+Cl+Br+I.

2. The infrared transmitting glass according to claim 1, being substantially free of Cd, Tl, and Pb.

3. The infrared transmitting glass according to claim 1, having an infrared absorption edge wavelength of 20 μm or more when having a thickness of 2 mm.

4. An optical element comprising:
the infrared transmitting glass according to claim 1.

5. An infrared sensor comprising:
the optical element according to claim 4.

* * * * *